March 12, 1968

W. R. DUNN 3,372,707

PRESSURE REGULATOR VALVE

Filed April 12, 1965

INVENTOR.
WILLIAM R. DUNN
BY
*Alan M. Staubly*
ATTORNEY

United States Patent Office 3,372,707
Patented Mar. 12, 1968

3,372,707
PRESSURE REGULATOR VALVE
William R. Dunn, Los Angeles, Calif., assignor to Honeywell Inc., Minneapolis, Minn., a corporation of Delaware
Filed Apr. 12, 1965, Ser. No. 447,410
7 Claims. (Cl. 137—505.25)

ABSTRACT OF THE DISCLOSURE

A pressure regulator valve wherein the pressure responsive flexible wall, the valve carrying portion and the valve seat are all parts of a single or unitary member mounted within the valve body.

Background of the invention

The present invention relates to control apparatus and more specifically to an improvement in flow control valves. While not limited thereto, my invention finds particular application in relatively small pressure operated valves, particularly pressure regulator valves. My invention lies also in the provision of an improved sub-assembly for use in a pressure operated valve.

There is a continuous effort on the part of manufacturers of flow control valves to simplify and thereby reduce the cost of such valves. Also, there is a need for reducing the physical size of these valves since they must often be used where space is at a premium. Regardless of these requirements, it is essential that the valves be reliable in operation.

Brief summary of invention

My invention provides a greatly simplified, and therefore a relatively inexpensive construction for a fluid flow control valve, particularly useful for fluid pressure regulators. The structure is particularly adaptable for very small valves, such as for those used in regulating the pressure of a stream of gas supplied to a pilot burner or the like. My improved valve utilizes a valve body which has a pair of ports and a cavity therebetween. Mounted in the cavity, and separating it into two chambers, is a pressure responsive member which takes the form of a unitary member including a peripheral sealing portion, a pressure responsive flexible wall portion, a valve carrying portion, and a valve seat. This unitary member is adapted to carry a valve closure member which cooperates with the valve seat and is movable toward and away from the valve seat in response to flexure of the flexible wall portion of the member to control the flow of fluid through the valve seat. This structure is not only simple and inexpensive but is easily assembled and requires no additional adjustment after assembly.

An object of my invention is to provide an improved fluid flow control valve.

A further object of my invention is to provide a fluid flow control valve which is simple in construction and relatively inexpensive compared to prior devices, but which provides accurate and reliable control of the fluid being conveyed.

A further object of my invention is to provide, for use in a fluid flow control valve, a sub-assembly comprising a unitary member which includes a sealing portion, a valve seat portion, a valve carrying portion movable toward and away from the seat, and a pressure responsive movable wall which is adapted to move the valve carrying portion.

These and other objects of my invention will become apparent upon reading the following detailed description of the preferred embodiment of my invention with reference to the drawing wherein.

Detailed description

Figure 1:
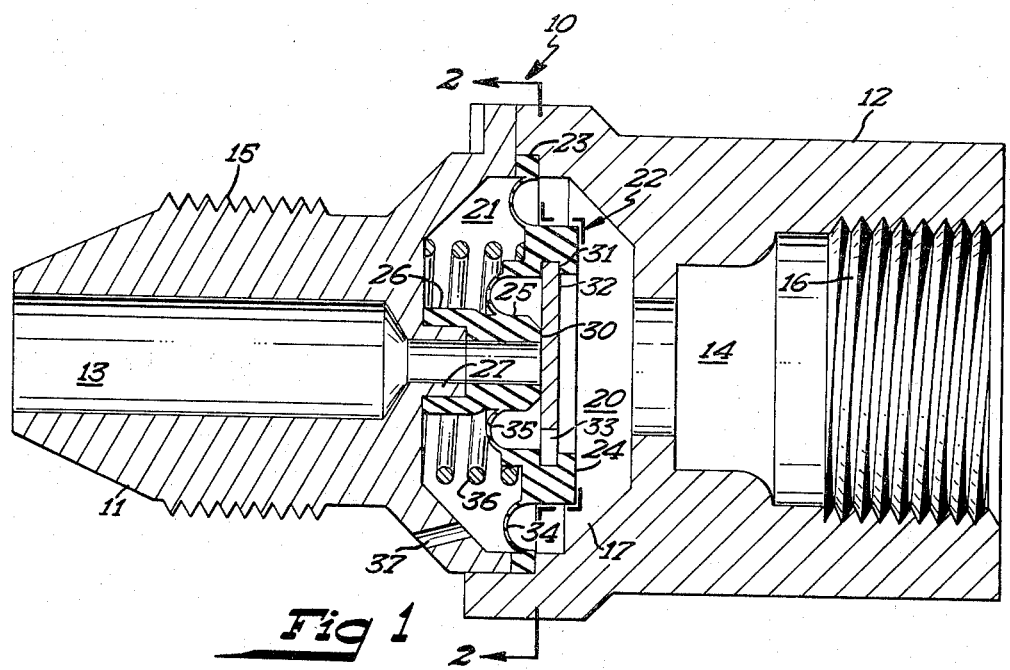
FIGURE 1 is a longitudinal cross-sectional view of a miniature pressure regulator valve constructed according to my invention.

Referring to the drawing, the numeral 10 generally designates a pressure regulator valve having a valve body made up of two portions 11 and 12. The body portion 11 has an inlet port 13 extending thereinto and body portion 12 has an outlet port 14 extending therethrough. The body may be adapted for connection into appropriate fluid conduit or the like by appropriate means such as a flare fitting 15 surrounding the inlet port 13 and a threaded portion 16 which surrounds the outlet port 14.

The valve body has an inner cavity 17 which is separated into two chambers, an outlet chamber 20 and a control chamber 21, by a member generally designated by the numeral 22 which is a unitary member made up of a plurality of functional portions or parts. Member 22 has an outer peripheral sealing portion or rib 23, which is preferably annular in shape, and is adapted to be clamped or pressed between the two body members 11 and 12 so as to provide a fluid tight seal therebetween. The two body members may be clamped together on opposite sides of this peripheral sealing portion by an appropriate means, for example, by having a portion of body member 12 struck over to tightly engage a shoulder on body member 11.

Member 22 also includes an intermediate annular valve carrying portion 24 and a central portion 25. Central portion 25 includes a generally tubular fluid conduit member which has one end 26 adapted to be connected to the inlet port 13 of the valve. For example, it may be fitted tightly over an inwardly extending tubular portion or nipple 27 of the body member 11, surrounding inlet port 13. At the opposite end, member 25 has formed thereon a valve seat 30 which is also generally coaxial with inlet port 13.

Figure 2:
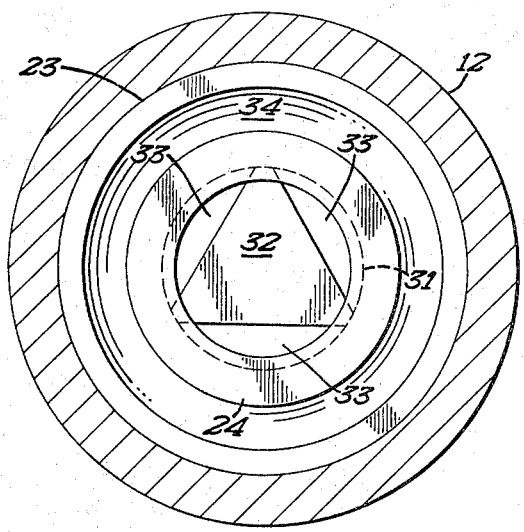
FIGURE 2 is a transverse cross-sectional view of the presure regulator valve taken generally along line 2—2 of FIGURE 1.

Valve carrying portion 24 is generally concentric with the central portion 25 and is radially spaced therefrom. As seen in the drawing, portion 24 has formed therein, in a plane generally transverse to the axis of the valve, an annular groove 31 which is utilized to retain a valve closure member 32. As seen in FIGURE 2, valve closure member 32 is formed with a triangular or other non-round shape so that when the closure member is retained in groove 31 there are a plurality of fluid passage spaces 33 between the closure member and the valve carrying member 24.

Connecting the peripheral portion 23 and the outer surface of intermediate valve carrying portion 24, is a relatively flexible annular portion 34 which is preferably relatively thin and diaphragm-like. Similarly, a flexible annular diaphragm-like portion 35 connects the inner surface of valve carrying portion 24 and the central portion 25, adjacent the valve seat 30. A spring 36, disposed in control chamber 21, urges valve carrying portion 24, and thereby valve closure member 32, away from seat 30. Control chamber 21 is connected to atmosphere as by an opening through body member 11.

Obviously, this valve is extremely simple to assemble because of the very small number of parts. The flexible member 22 and the valve closure member 32 carried thereby form a subassembly which is readily assembled with the valve body. As noted previously, member 22 is a unitary member including several parts or portions. It is preferably molded from a flexible material and hence the closure member 32 can readily be slipped into the retaining groove 31 of the valve carrying portion 24. It should be noted, however, that member 20 may be formed from material such as metal with the flexible portions 34 and 35 constructed as bellows. Nevertheless, member 22 may be referred to as a "flexible member" since certain portions of it are movable with respect to each other whether portions 23, 24 and 25 are flexible or not. To assemble the valve, the closure member is mounted in the valve carrying portion of member 22 so that this unit forms a sub-assembly and then this is, in turn, assembled with the valve body. Such assembly can be readily accomplished by placing the spring 36 about the central portion 25 of flexible member 22 and then forcing the central tubular portion 25 over the nipple 27 of the inlet end of the valve body. Outer peripheral flange 23 is then simply positioned with respect to the inlet body portion 11 and the outlet body portion 12 is mated with it so that the peripheral flange of the flexible member 22 is sandwiched between the two body members. The two body members are then fastened securely together by any appropriate means.

The valve operates as does any conventional pressure regulator valve. The fluid enters the inlet port 13 and passes through the central tubular portion 25 of the flexible member 22 to the annular valve seat 30. The flow through this valve seat is controlled by valve closure member 32 which is carried by the valve carrying portion 24 of the flexible member 22 and is thus maintained in a plane generally parallel to the plane of the valve seat. It will be noted that valve closure member 32 is substantially larger than is the annular valve seat 30 so that the valve seat can readily close off the valve seat when it moves towards the seat. Also, due to the non-round configuration of the valve closure mmber 32, which is disposed in the circular opening of valve carrying member 24, openings 33 are left between the valve closure member and the flexible member which carries it. Spring 36 normally urges valve closure member 32 away from the valve seat so that fluid can flow from the valve seat through the openings 33 and to the outlet port 14. However, the pressure of the fluid in the outlet chamber 20 acts against the flexible member 22 and urges the valve closure member against the seat in opposition to the force of spring 36. As noted previously, control chamber 21 is preferably connected to atmosphere. An aperture 37 provides this connection. Thus, the flow through the valve is regulatd so as to maintain a desired fluid pressure in outlet chamber 21. This fluid pressure is determined by the effective pressure responsive areas within the valve structure and by choosing an appropriate spring 36 to give the desired pressure level.

From the foregoing it can be seen that my invention provides an improved valve construction which is greatly simplified compared to prior art structures. This results in a valve which is extremely compact and can be utilized where a very small valve is needed. Also, it results in a relativly inexpensive valve which is nevertheless reliable and capable of accurate regulation. One of the principle advantages obtained from my invention is the ease of assembly of the valve due to the use of the unique sub-assembly made of the valve closure member carried by the unitary member which includes the sealing rib, the flexible diaphragm, the valve carrying assembly and the valve seat.

While a single preferred embodiment has been described herein, various modifications may become apparent to those skilled in the art upon their becoming familiar with my disclosure herein. Therefore, it is to be understood that my disclosure herein is for illustrative purposes only and my invention is to be limited solely by the scope of the appended claims.

I claim:

1. A fluid pressure regulator valve of the type having a valve body with an inlet and an outlet and a cavity therebewteen, a valve seat intermediate the inlet and outlet, a valve closure member cooperable with the valve seat, a pressure responsive diaphragm, means operably connecting the diaphragm to the closure member, the diaphragm being disposed in the cavity and responsive to outlet pressure to urge the closure member against the valve seat, and means urging the closure member away from the seat in opposition to outlet pressure, the valve being characterized in that the pressure responsive diaphragm, the valve seat and the means connecting the closure member to the diaphragm are formed as a single element from a flexible material.

2. The fluid pressure regulator valve of claim 1 further characterized in that said valve seat forms part of a fluid conduit portion of said single element, said fluid conduit portion having one end connected to said inlet and a second end terminating in the valve seat; and said diaphragm includes a readily deformable portion, connecting said fluid conduit portion to the means operably connecting the diaphragm to the closure member.

3. The fluid pressure regulator valve of claim 1 further characterized in that said diaphragm includes an outer annular sealing portion sealingly connected to the valve body; said valve seat forms a part of a generally tubular fluid conduit portion substantially co-axial with said outer annular portion of the diaphragm and having one end connected to said inlet and the other terminating in said valve seat; said means operably connecting the diaphragm to the closure member includes a generally annular valve-carrying member formed to have the closure member substantially rigidly attached thereto and disposed substantially co-axial with said fluid conduit portion and radially intermediate said fluid conduit portion and said outer annular sealing portion; and said diaphragm further includes a first annular portion connecting said annular sealing portion and said valve-carrying member and a second annular portion connecting said valve-carrying member to said fluid conduit portion, said first and second annular portions of said diaphragm being readily deformable to render said valve-carrying member movable with respect to said annular-sealing portion and said fluid conduit portion, in an axial direction toward and away from said valve seat.

4. The fluid pressure regulator valve of claim 3 further characterized in that said annular valve-carrying member has an annular valve retaining groove along the inner periphery thereof and in a plane generally parallel to the valve seat; and said valve closure member is a generally flat, non-round, valve closure member held in said annular retaining groove in the valve-carrying member, said closure member including a central portion cooperable with said valve seat, the non-round shape of said closure member and the annular shape of the groove in said valve-carrying member providing a plurality of openings between said closure member and said valve-carrying portion.

5. A unitary member for use in a fluid flow control valve comprising, as a one-piece member constructed from a flexible material: an outer peripheral portion adapted to be sealingly connected to the walls of a valve body; an intermediate valve carrying portion; a central portion including an apertured element having one end adapted for connection to a fluid conduit and the other end defining a valve seat; a first readily deformable portion connecting said peripheral portion to said valve carrying portion; and a second readily deformable portion connecting said valve carrying portion to said central portion, said valve carrying portion being movable toward and away from said valve seat upon flexure of said first and second readily deformable portions.

6. A sub-assembly for use in a flow control valve comprising: a one-piece member constructed from a flexible material and including a central tubular portion having one end defining a valve seat, an annular valve-carrying portion disposed generally coaxially with said central portion and spaced radially therefrom, said annular valve carrying portion having a valve retaining groove along the inner circumference thereof and in a plane generally parallel to the plane of said valve seat, an outer peripheral portion defined by an annular rib disposed generally coaxially with said central and said valve carrying portions and spaced radially outward therefrom, a first readily deformable annular portion connecting said peripheral portion and said valve-carrying portion, and a second readily deformable annular portion connecting said valve-carrying portion and said central portion so that said valve-carrying portion is movable axially with respect to said central portion and said outer peripheral portion upon flexure of said first and second readily deformable portions; and a valve closure member having a portion retained in the retaining groove in said valve carrying portion, said valve closure member being cooperable with said valve seat and movable with respect thereto upon movement of said valve carrying portion.

7. A sub-assembly for use in a flow control valve comprising: a one-piece member constructed from a flexible material including a central tubular portion having one end defining an annular valve seat, an annular valve-carrying portion disposed generally coaxially with said central portion and spaced radially therefrom, said valve carrying portion having an annular valve retaining groove along the inner circumference thereof and in a plane generally parallel to the plane of said valve seat, an outer peripheral portion defined by an annular rib disposed generally coaxially with said central and said valve carrying portions and spaced radially outward therefrom, a first readily deformable annular portion connecting said peripheral portion and said valve-carrying portion, and a second readily deformable annular portion connecting said valve-carrying portion and said central portion so that said valve-carrying portion is movable axially with respect to said central portion and said outer peripheral portion upon flexure of said first and second readily deformable portions; and a generally flat non-round valve closure member held in the annular retaining groove in said valve carrying portion, the non-round shape of said closure member providing a plurality of openings between said closure member and said valve carrying portion, and said closure member including a central portion cooperable with said valve seat, said closure member being movable with rspect to said seat by movement of said valve carrying portion.

References Cited
UNITED STATES PATENTS

| | | | |
|---|---|---|---|
| 2,887,120 | 5/1959 | De See | 137—223 |
| 2,935,083 | 5/1960 | Singer | 137—505.25 |
| 3,075,546 | 1/1963 | Roberts | 137—505.25 |

ALAN COHAN, *Primary Examiner.*

HAROLD W. WEAKLEY, *Examiner.*